Sept. 18, 1962  R. E. PRICE  3,054,227
CONTROL WHEEL DRIVE FOR CENTERLESS GRINDERS
Filed Jan. 8, 1960  3 Sheets-Sheet 1
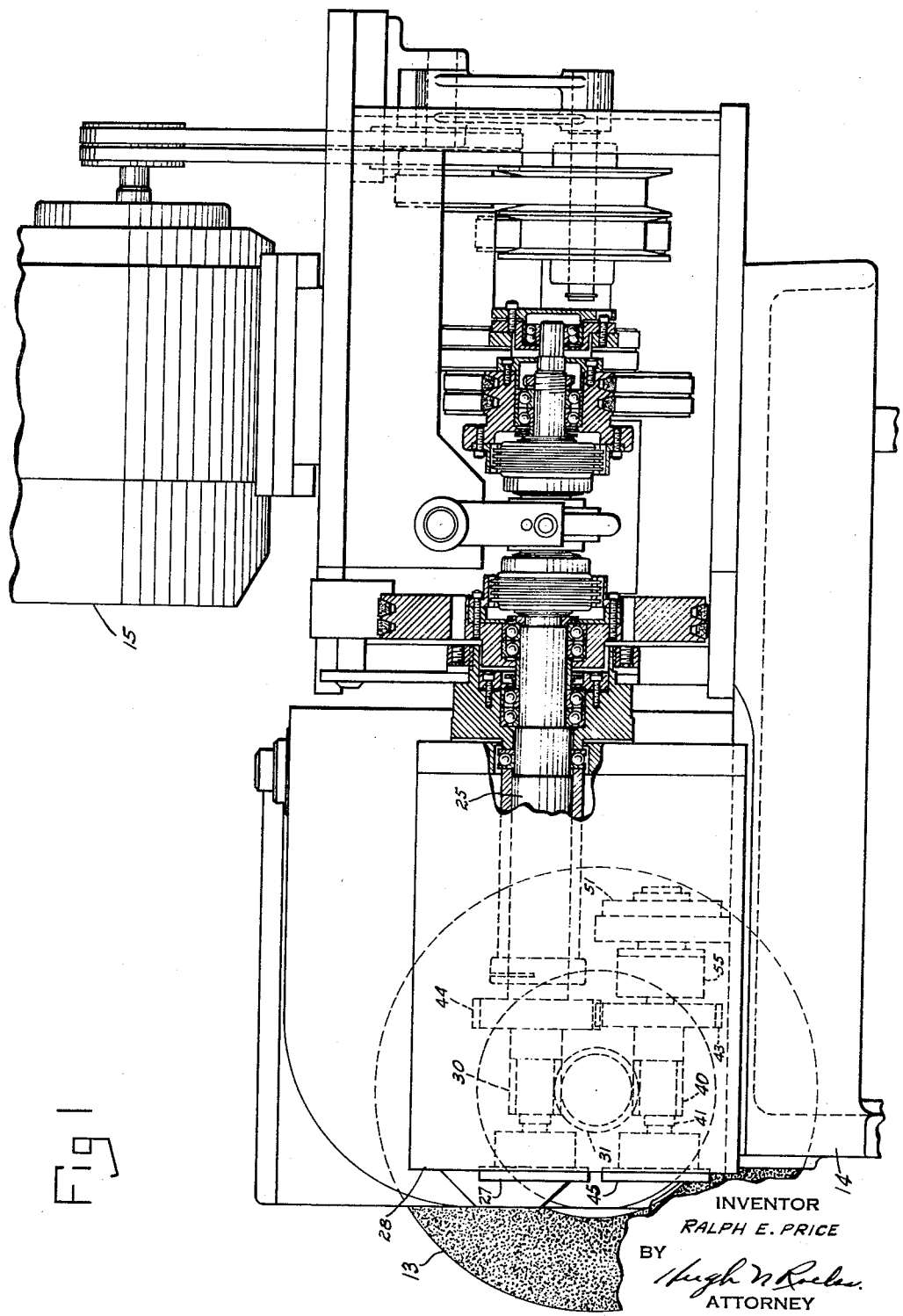
INVENTOR
RALPH E. PRICE
BY
Hugh N Roeber
ATTORNEY

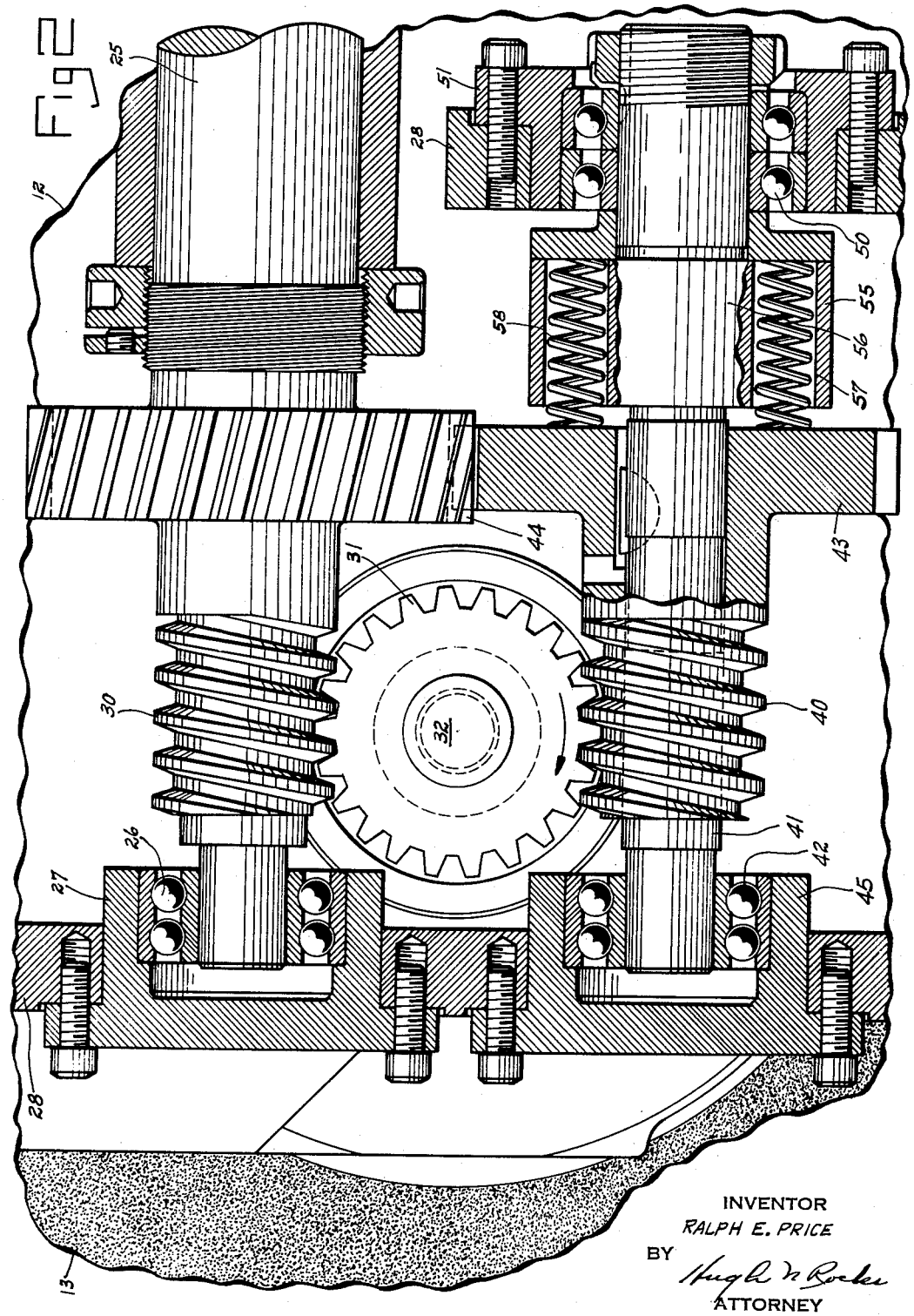

Sept. 18, 1962 R. E. PRICE 3,054,227
CONTROL WHEEL DRIVE FOR CENTERLESS GRINDERS
Filed Jan. 8, 1960 3 Sheets-Sheet 3
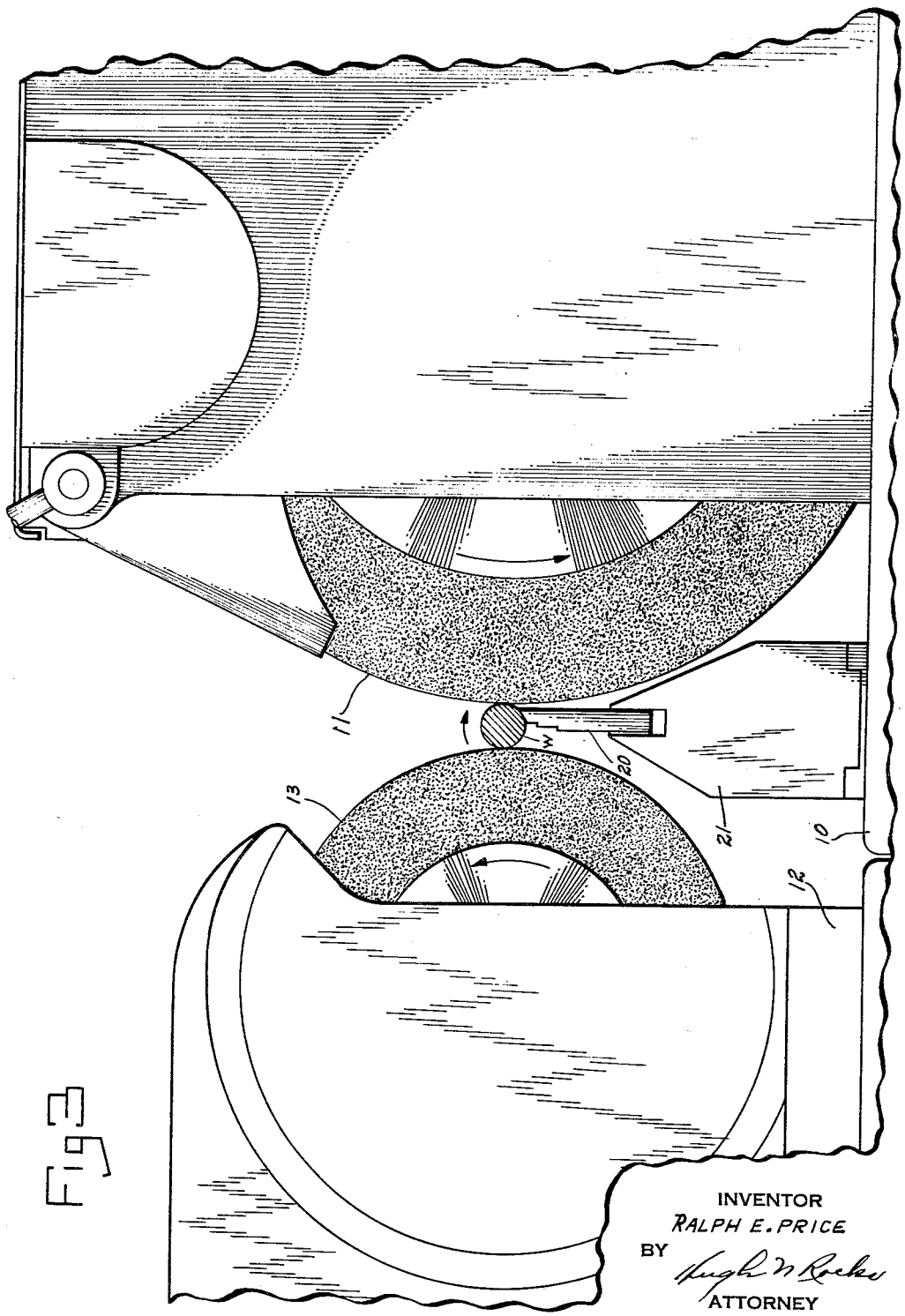
INVENTOR
RALPH E. PRICE
BY
ATTORNEY United States Patent Office
3,054,227
Patented Sept. 18, 1962

3,054,227
CONTROL WHEEL DRIVE FOR CENTERLESS GRINDERS
Ralph E. Price, Waynesboro, Pa., assignor to Landis Tool Company, Waynesboro, Pa.
Filed Jan. 8, 1960, Ser. No. 1,278
4 Claims. (Cl. 51—103)

This invention relates to centerless grinders, particularly to the means for driving the control or regulating wheel of such a machine.

The problem of driving a control wheel or a regulating wheel is unique in many respects. The heavy load assumed by the control wheel drive is when the control wheel is running idle, that is, when the grinding wheel is not grinding. When the grinding wheel engages the workpiece, a driving force is transmitted from the grinding wheel through the workpiece to the control wheel. The control wheel changes from a driving medium to a retarding medium. This driving force varies with the force exerted on the work by the grinding wheel. The power transmitted to the control wheel in this manner varies continuously because the feeding movement is never in perfect synchronism with the rate of stock removal, particularly at the beginning and at the end of a grinding operation. Grinding feed is reduced and finally stopped for sparkout grinding. During this part of the grinding cycle, the grinding wheel cuts itself free of the work and the driving effect of the grinding wheel on the control wheel diminishes gradually to zero. As the zero point is approached, the rotation of the work is taken over by the control wheel. If the speed of the control wheel changes at this time, the work may be ground slightly out of round.

Many attempts have been made to overcome this effect of change in the source of driving action on the workpiece. Most of these attempts consist of some form of braking device or mechanism, none of which has been particularly successful. A recent development consists of a worm gear drive to the control wheel spindle and separate driving means which applies a turning force to the control wheel. The worm and worm wheel determine the rate of rotation of the spindle, but do not supply the driving torque. The present invention represents an improvement over the more recent device in that it does not require a separate motor to provide the turning force on the control wheel spindle.

It is, therefore, an object of this invention to provide a control wheel drive which will maintain a constant wheel speed regardless of changes in load.

Another object is to provide a worm gear drive for the control wheel spindle having means capable of eliminating the effect of the driving forces transmitted from the grinding wheel.

Another object is to provide a driving means for the control wheel of a centerless grinder which will maintain an unvarying rate of rotation throughout a wide variation of load conditions.

FIG. 1 is a rear elevation showing elements of the control wheel drive.

FIG. 2 is a sectional rear elevation showing the principal elements of the control wheel drive.

FIG. 3 is a partial front elevation of a conventional centerless grinding machine.

In FIG. 3, numeral 10 indicates a grinding wheel support having a grinding wheel 11 rotatably mounted thereon. The control wheel support 12 has a control wheel 13 rotatably mounted thereon. Wheel supports 10 and 12 are slidably mounted on bed 14.

Workpiece W is held between wheels 11 and 13 on work rest member 20 mounted on base 21. The means for driving control wheel 13 consists of motor 15 driving through a suitable adjustable pitch pulley type of speed change and then through a belt drive having a selective high and low range to drive shaft 25. Drive shaft 25 has a worm gear 30 formed thereon.

Worm gear 30 engages worm wheel 31 on control wheel shaft 32. Worm gear 40 mounted or formed on shaft 41 engages worm wheel 31 at a point opposite worm gear 30. Shaft 41 also has mounted thereon a helical gear 43 which co-acts with helical gear 44 of the same diameter on shaft 25.

The left hand ends of shafts 25 and 41 are mounted in anti-friction bearings 26 and 42 respectively. Bearing 26 is, in turn, mounted in a cup-like member 27 removably mounted in housing 28. Bearing 42 is mounted in a cup-like member 45 removably mounted in housing 28.

The other end of shaft 41 is supported in bearings 50 in cup-like member 51 also removably attached to housing 28. Between bearings 50 and helical gear 43 is mounted another cup-like member 55 forming in conjunction with an enlarged portion 56 of shaft 41, an annular space 57 in which are mounted in angularly spaced relation, a plurality of springs 58.

Springs 58 extend beyond space 57 to engage helical gear 43 which along with worm gear 40, is slidably mounted on shaft 41. The axial force exerted by springs 58 causes worm gear 40 to function as a rack as well as a worm to urge worm wheel 31 and control wheel 13 in a clockwise direction, in the same direction as the force transmitted by grinding wheel 11 through workpiece W to control wheel 13. Movement of both of these forces is resisted by worm gear 30 which permits rotation of worm wheel 31 and control wheel 13 at a uniform rate unaffected by the driving action of grinding wheel 11.

I claim:
1. In a centerless grinding machine, a grinding wheel, a control wheel, a control wheel spindle for rotatably supporting said control wheel, a worm wheel on said control wheel spindle, a worm gear on each side of said worm wheel, means for driving said worm gears, and means for urging one of said worm gears axially in the general direction of rotation of said control wheel.

2. In a centerless grinding machine, a wheel support, a spindle rotatably mounted in said wheel support, a control wheel on said spindle, a worm wheel on said spindle, worm gears on parallel shafts in operative relation with said worm wheel, co-acting gears on said shafts whereby rotation of one shaft will cause rotation of the other, means for yieldingly urging one of said shafts in an axial direction, and a single driving means for said shafts and said spindle.

3. In a centerless grinding machine, a wheel support, a spindle rotatably mounted in said wheel support, a control wheel on said spindle, a worm wheel on said spindle, a worm gear in operative engagement with said worm wheel, a second worm gear in operative engagement with said worm wheel, means for driving one of said worm gears, and a rotatable driving connection between said worm gears.

4. In a centerless grinding machine, a wheel support, a spindle rotatably mounted in said wheel support, a control wheel on one end of said spindle, a worm wheel on the other end of said spindle, a worm gear in operative engagement with said worm wheel, means for rotating said worm gear, a second worm gear in operative engagement with said worm wheel, a driving connection between said worm gears whereby said worm rotating means rotates both of said worm gears, and means for urging one of said worm gears axially in the direction of rotation of said worm wheel so that said worm gear exerts a driving force on said worm wheel while said other worm gear exerts a retarding force on said worm wheel.

References Cited in the file of this patent

UNITED STATES PATENTS

| | | |
|---|---|---|
| 2,872,757 | Ekholm | Feb. 10, 1959 |
| 2,913,854 | Ekholm | Nov. 24, 1959 |